United States Patent [19]

Cuny et al.

[11] Patent Number: 4,763,681

[45] Date of Patent: Aug. 16, 1988

[54] PROCESS FOR CONTROLLING THE FLOW OF A FLUID IN A VALVE AND APPARATUS FOR CARRYING OUT SAID PROCESS

[75] Inventors: Francis Cuny, Mezy-sur-Seine; Hugues Vermeille, Meylan; Jean Arnault, Saint-Nazaire-les-Eymes, all of France

[73] Assignee: L'Air Liquide, Paris, France

[21] Appl. No.: 13,652

[22] Filed: Feb. 12, 1987

[30] Foreign Application Priority Data

Feb. 14, 1986 [FR] France ................ 86 02012

[51] Int. Cl.[4] .................................................. G05D 7/06
[52] U.S. Cl. .................................... 137/8; 437/486; 437/487.5
[58] Field of Search ............... 137/486, 487.5, 14, 137/8

[56] References Cited

U.S. PATENT DOCUMENTS

3,524,344 8/1970 Converse et al.
4,446,523 5/1984 Reinke.
4,527,583 7/1985 Simpson .................... 137/487.5 X

FOREIGN PATENT DOCUMENTS

61856 10/1982 European Pat. Off.
3241783 5/1983 Fed. Rep. of Germany.
2447012 8/1980 France.
2026704 2/1980 United Kingdom.

OTHER PUBLICATIONS

*Control Engineering;* "Gas Flow Control"; by Harter; vol. 10, No. 9; Sep. 1963, pp. 101–105.

*Primary Examiner*—Alan Cohan
*Attorney, Agent, or Firm*—Lee C. Robinson, Jr.

[57] ABSTRACT

Process for controlling the flow of a fluid through a valve having a given section and a movable valve member, in which the pressures of the fluid which are upstream $P_{upstream}$ and downstream $P_{downstream}$ of the valve and the position d of the valve member are measured, then the real flow $Q_{real}$ of the fluid is calculated and compared with a set value $Q_0$, the difference signal $Q_{real}-Q_0$ commanding the displacement of the valve member in the desired direction, said process comprising effecting the real flow calculation by measuring the ratio $R=P_{upstream}/P_{downstream}$ which is compared with a predetermined value R and calculating the product $Q_{sonic}=k \times P_{upstream} \times d$ so that when $R>R_0$, the product $Q_{sonic}$ is directly compared with a set value $Q_0$, the difference signal $Q_{sonic}-Q_0$ commanding the displacement of the valve member in the desired direction whereas, when $R<R_0$, the ratio R is converted into a digital signal whose value corresponds to the address of a memory whose content is converted into an analog correction signal which, after multiplication by $Q_{sonic}$, represents a value proportional to the flow $Q_{subsonic}$ of the fluid at the subsonic rate, this value $Q_{subsonic}$ being then compared with the set value $Q_0$, the signal $Q_{subsonic}-Q_0$ commanding the displacement of the valve member in the desired direction.

5 Claims, 4 Drawing Sheets

PROCESS FOR CONTROLLING THE FLOW OF A FLUID IN A VALVE AND APPARATUS FOR CARRYING OUT SAID PROCESS

The present invention relates to a process for controlling the sonic and subsonic rate of flow of a fluid through a valve which has a given section and a movable valve member in which there are measured the upstream fluid pressure $P_{upstream}$ and downstream fluid pressure $P_{downstream}$ of the valve and the position d of the valve member after which the flow $Q_{real}$ of the fluid is calculated and compared with a set value $Q_O$, the difference signal $Q_{real} - Q_O$ commanding the displacement of the valve member in the desired direction.

The invention also relates to an apparatus for carrying out this process, this apparatus being of use for both sonic and subsonic rates of flow, without discontinuity.

There is known from the European patent application No. 86,259 a gas flow generator comprising an orifice through which travels the gas flowing from an upstream chamber, in which prevails an upstream pressure, into a downstream chamber, in which prevails a downstream pressure, this orifice being closed to a varying extent by an electrically controlled movable valve member. This valve member provides a passage whose area is determined by its position. The latter is measured so as to obtain a first electric signal and the difference between the upstream pressure and downstream pressure is also measured for providing a second electric signal representing this pressure difference. These two signals are applied to the two respective inputs of an electrical calculating circuit which delivers at its output a signal corresponding to the effective flow of the gas. This latter signal may then be compared with a set signal and the resulting error signal may be used for commanding the displacement of the valve member in the determined direction.

Similar systems are also described in the SIEMENS-ZEITSCHRIFT article, Vol. 41, No. 8, August 1967, pages 692–695, Erlangen; KURT EWE: "Betriebserprobung eines Segmentblendenschiebers als Messgeber und Stellglied fur Durchflusse in extrem grossen Berichen," and in the REGELUNGSTECHNISCHE PRAXIS article, Vol. 19, No. 4, April 1977, pages M17–M20, R. Oldenbourg Verlag, Munich; G. STROHRMANN: "Losungen von MSR-Aufgaben."

In the article of the CONTROL ENGINEERING review, Vol. 10, No. 9, September 1963, pages 101–105, N.Y. (USA) of G. HARTER, entitled "Gas flow control: a fresh viewpoint," there is described a fluid flow control system in which there are measured the upstream and downstream pressures of the fluid with respect to a valve, and the upstream temperature of the fluid; the position of the movable valve member of the valve is also measured, the valve having a constant section. These four data are sent to a calculator in which, depending on the conditions of the flow of the fluid (sonic or subsonic), there is calculated, as a function of equations given in said article, the real flow of the fluid through the valve, the resulting signal issuing from the calculator being compared with a set value, the error signal resulting from the comparison enabling the movable valve member to be acted upon in the required direction.

Although such a system works well, it is found to be particularly cumbersome as concerns the means employed. Indeed, the calculator employed must determine first of all which type of flow rate (sonic or subsonic) is concerned, then in either case calculate the flow as a function of the parameters given to it with the aid of the corresponding equations. The found value is then compared with the set value according to a conventional control system controlling the position of the valve member at the measured value. Thus, for example, for a given gas and given conditions of utilisation, the calculator must periodically recalculate the flow which amounts to carrying out the same operation an infinite number of times.

The process according to the invention enables the method for calculating the flow to be considerably simplified and the means for carrying out the method to be consequently also considerably simplified.

The invention is based on the fact that it is possible to calculate in all the cases of sonic or subsonic rates of fluid flow a value corresponding to the value of the flow at a sonic rate and then apply to this calculated value a correction coefficient when it has been determined that the flow rate of the gases was subsonic.

The gist of the invention consists first of all in calculating the gas flow through the valve as a function of the position of the valve member and of the pressure of the fluid upstream of the valve, in assuming that the flow of the fluid is sonic, the calculation being in this case easy. It is then determined, by comparison of the downstream and upstream pressures of the fluid, whether the flow is sonic or subsonic. If the flow is sonic, the value of the flow is already calculated. If the flow is subsonic, the value of the sonic flow is multiplied by a correction coefficient which will be taken from a memory, the address of this memory being a bi-univocal function of the ratio between the upstream and downstream pressures of the fluid.

The process according to the invention is characterised in that it comprises calculating the flow $Q_{real}$ by first of all obtaining the product $Q_{sonic} = k \times P_{upstream} \times d$, representing the real flow of the fluid when the fluid flow rate is sonic, k being a constant which is a function of the temperature of the fluid and of the section of the valve, then comparing the upstream pressure $P_{upstream}$ with the downstream pressure $P_{downstream}$ to determine whether the fluid is flowing at a sonic or subsonic rate, the flow $Q_{real}$ representing the real flow when the flow rate is sonic while, when the flow rate is subsonic, the value Q is multiplied by a correction coefficient so as to obtain the value $Q_{real}$ of the real flow.

Preferably, there will be employed a correction system in respect of the subsonic rate of flow, with the use of the gaseous flow law expressed in the following form:

$$Q = \frac{K}{\sqrt{T}} \times S \times P_{up}\sqrt{\frac{1}{M} \times \frac{\gamma}{\gamma - 1}\left[\left(\frac{P_{up}}{P_{do}}\right)^{-\frac{2}{\gamma}} - \left(\frac{P_{up}}{P_{do}}\right)^{-\frac{\gamma+1}{\gamma}}\right]}$$

in which the various values of the radical when $P_{upstream}/P_{downstream}$ varies are stored in a discrete and ordered manner in a read memory or a programmable read memory (ROM or EPROM).

According to a preferred embodiment, the value of the aforementioned radical comes directly from the memory location whose address is equal to $P_{upstream}/P_{downstream} \times B$, in which B is a predetermined coefficient. The value of this coefficient of course depends on the number of available memory locations. In particular, bearing in mind the fact that $P_{upstream}/P_{downstream}$ is greater than or equal to 1 (since if this condition were not so, there would be no flow in the desired direction), the coefficient B will represent the address of the first memory location employed.

When a gas flow occurs through a pipe of effective section S, the gas flow does not depend on the downstream pressure of the gas when the ratio of the upstream pressure (absolute) to the downstream pressure (absolute) $X = P_{upstream}/P_{downstream}$ is greater than a fixed critical value $$X_c = \left(\frac{\gamma + 1}{2}\right)^{\frac{\gamma}{\gamma - 1}}$$

$\gamma$ being the ratio of the specific heats at constant pressure and constant volume $$\left(\gamma = \frac{C_P}{C_V}\right)$$

In this case, the gas flow which is sonic through the pipe is equal to:

$$Q_{sonic} = \frac{K}{\sqrt{T}} \times S \times P_{up} \times f(\gamma, M)$$

in which expression $$f(\gamma, M) = \sqrt{\frac{\gamma}{M(\gamma + 1)} \left(\frac{2}{\gamma + 1}\right)^{\frac{2}{\gamma - 1}}}$$

Under these conditions, the gas flow is said to be at the sonic rate, K being a coefficient which is a function of the geometry of the measuring system, T the absolute temperature, M the molecular weight of the gas.

When the ratio of the pressures becomes lower than the critical value $X_c$, the subsonic flow of the gases in the same pipe is given by the following formula:

$$Q_{subsonic} = \frac{K}{\sqrt{T}} \times S \times P_{up} \times f(\gamma, M) \times g(\gamma, X)$$

with $$f(\gamma, M) = \sqrt{\frac{\gamma}{M(\gamma + 1)} \times \left(\frac{2}{\gamma + 1}\right)^{\frac{2}{\gamma - 1}}}$$

and $$g(\gamma, X) = \sqrt{\frac{\gamma + 1}{\gamma - 1} \left(\frac{\gamma + 1}{2}\right)^{\frac{2}{\gamma - 1}} \left(X^{-\frac{2}{\gamma}} - X^{-\frac{\gamma - 1}{\gamma}}\right)}$$

When X is less than $X_c$, the rate is said to be subsonic.

When $X = X_c$, it is checked that $g(\gamma, X) = 1$.

In the subsonic rate formula given above, it is clear that this subsonic flow is equal to the value of the sonic flow multiplied by a correction coefficient $g(\gamma, X)$.

A better understanding of the invention will be had from the following description of embodiments which are given by way of non-limiting examples with reference to the accompanying drawings in which.

Figure 1:
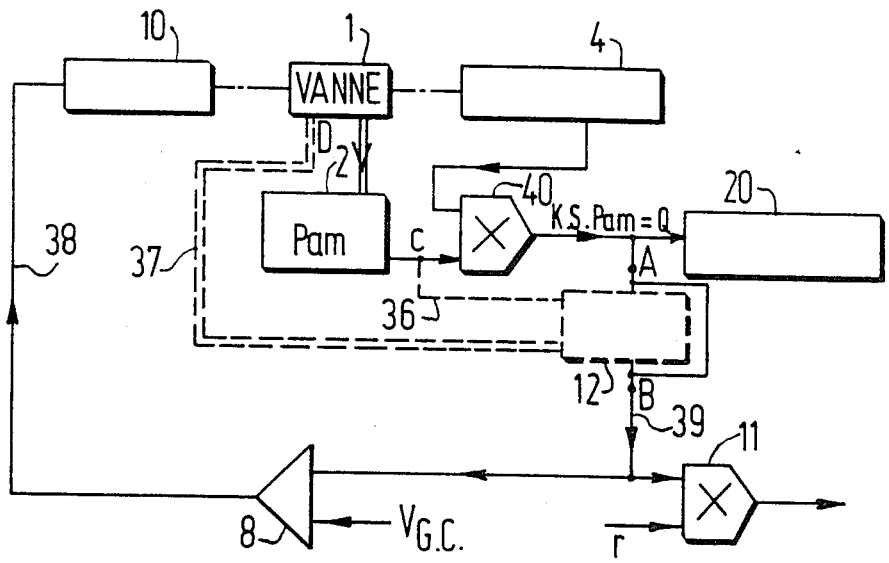
FIG. 1 is a diagrammatic representation of the process according to the invention.

FIG. 1 is a diagrammatic view of the system according to the invention. The valve 1 whose rate of flow must be regulated is connected to a displacement sensor 4 which measures the displacement of the movable valve member of the valve 1, and to a pressure sensor 2 measuring the pressure on the upstream side of the valve 1. The electric signals delivered by the sensors 2 and 4 are sent to a multiplying circuit 40 which delivers a signal $Q = K \times S \times P_{upstream}$. This signal represents the value of the gas flow at the sonic rate, which value is displayed by the device 20. This measured value of the flow $Q_{sonic}$ is transmitted by the line 39 (through the connection in full line between A and B) to a comparator circuit 8 which compares this measured value with a set value $V_{G.C}$, the error signal delivered by the amplifier 8 being transmitted (through 38) to the actuating device 10 which acts mechanically on the valve member of the valve 1 and brings about a variation in the flow in the required direction (according to the usual principle of a regulation). The correction device according to the invention, which permits a multiplication of the calculated flow $Q_{sonic}$ by a correction coefficient when the gas flow becomes subsonic, is indicated by the reference 12 and inserted between A and B in line 39 (the connection in full line between A and B being then eliminated). This device 12 includes a pressure sensor $P_{downstream}$ which measures the pressure of the gas on the downstream side of the valve, which gas is sent to the device 12 through the pipe diagrammatically represented in dotted lines carrying the reference numeral 37. The device 12 also receives a pressure information $P_{upstream}$ through the electrical connection 36 inserted at C. Note that the device shown in FIG. 1 further comprises a multiplier circuit 11 into which the flow Q is sent and compared with the set value r which is the ratio obtained by dividing the flow of oxygen gas by the flow of fuel gas (when these two gases are used for example in an oxygen-fuel burner). The multiplier 11 may of course be eliminated when it concerns an application of the invention solely to the regulation of a flow valve 1.

Figure 2:
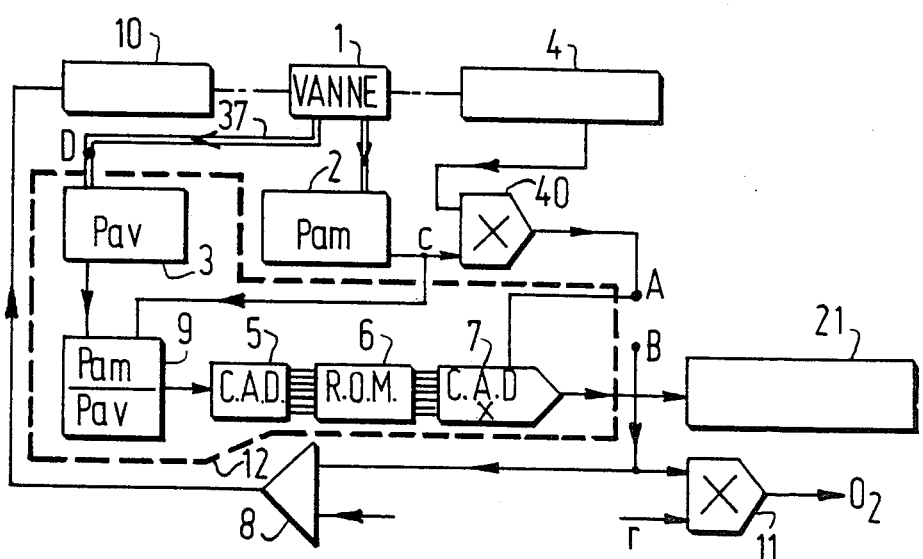
FIG. 2 is a detail view of the diagram of FIG. 1.

FIG. 2 is a view which is more detailed than FIG. 1, in particular as concerns the device 12. In this Figure, the same elements as those of FIG. 1 carry the same reference characters. The value of the calculated flow Q at point A is transmitted to a digital/analog converter multiplier 7. The pipe 37 (point D) conducts the gas on the downstream side of the valve to a pressure sensor $P_{downstream}$ carrying the reference character 3. This sensor 3 delivers an electric signal which is proportional to the downstream pressure of the gas to the circuit 9 whose other input receives an electric signal proportional to the pressure $P_{upstream}$ of the gas on the upstream side of the valve. The device 9 is a divider effecting the ratio $P_{upstream}/P_{downstream}$ and delivering an electric signal proportional to this ratio to the analog/digital converter 5. This converter converts the analog signal $P_{upstream}/P_{downstream}$ into a digital signal corresponding to one of the memory addresses of the memory (of the ROM type) 6. For example, if 128 memory locations are available, the converter will deliver a signal between 0 and 127 permitting in this way access to one of the memory locations of the memory 6. If the memory has $2^n$ memory locations, the converter 5 will convert the signal $P_{upstream}/P_{downstream}$ into a digital value between 0 and $2^n-1$. The converter 5 is electrically connected to the memory 6 and thus permits access to one of the locations of this memory, as explained before. When this memory location is activated, the content of the latter is transferred to the circuit 7 which is a digital/analog converter multiplier. Thus the content of the memory 7 is first of all converted into an analog signal representing the value of the correction coefficient, then said device 7 effects the product of the flow $Q_{sonic}$ which is sent to it through the point A and the correction coefficient issuing from the memory in the analog form, thereby delivering an analog signal whose amplitude represents the real value of the flow through the valve. This flow is sent for display in the device 21 and to the amplifier 8 which, as before, compares this calculated value with a set value and acts on the actuator 10 which itself controls the displacement of the valve member of the valve 1 in the required direction.

Figure 3:
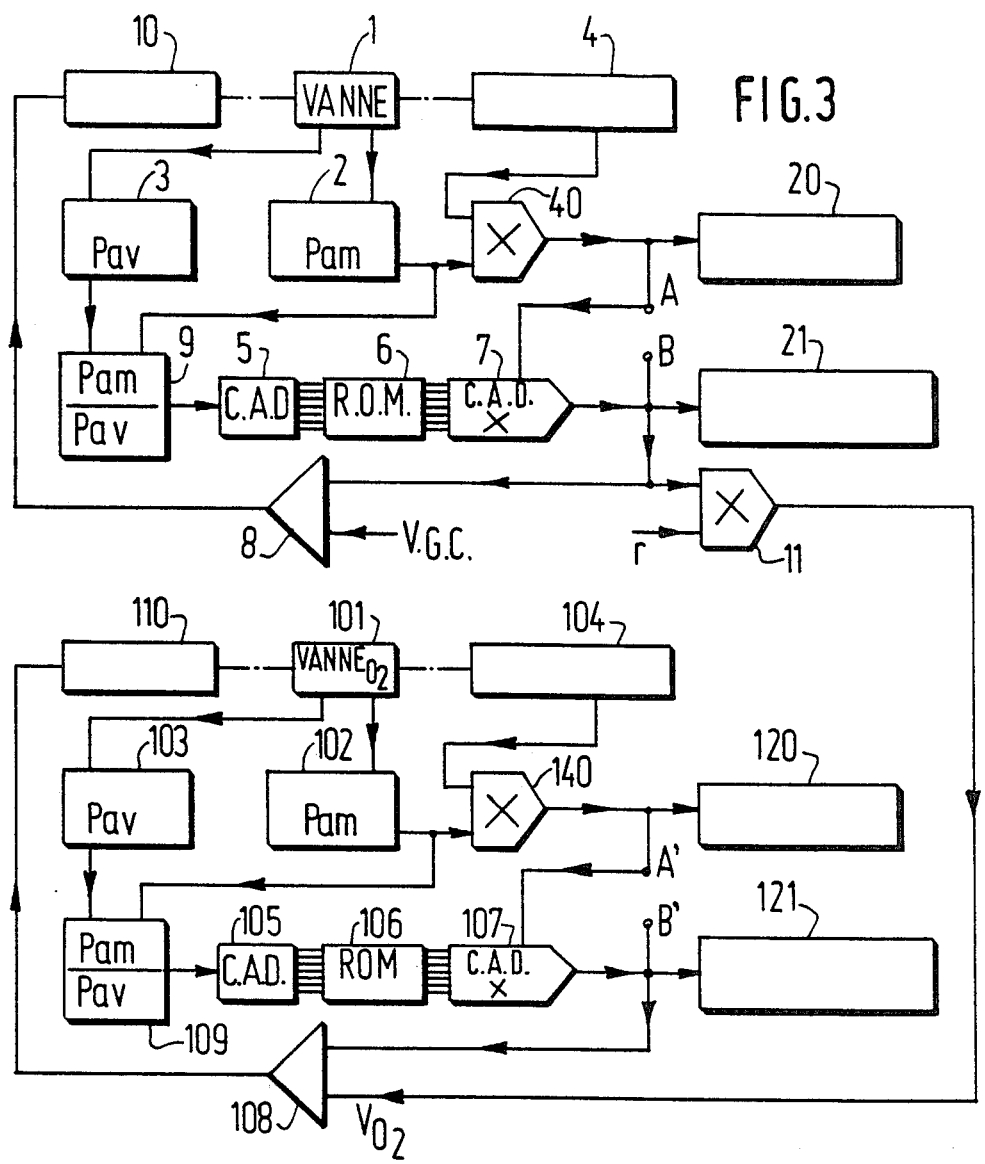
FIG. 3 is an example of an application of the invention to the regulation of an oxygen-fuel burner.

FIG. 3 is a diagram of the application in the case of the utilisation of for example an oxygen-fuel burner requiring the regulation of the flows of the fuel and the oxygen. In this FIG. 3, it will be noticed that the upper part of the Figure is identical to the diagram of FIG. 2 while the lower part is substantially the same (the reference numerals of the upper part are repeated in the lower part with the numeral 1 added in front). The flow measured in the fuel gas valve 1 is sent to the multiplier circuit 11 which, as a function of the set value r representing the ratio of the fuel gas/oxygen flows delivers, a set signal to the amplifier 108, namely the set signal $V_{o2}$. This signal represents the set value for the oxygen flow of the oxygen valve 101. The operation of the whole of the circuit shown in this diagram is the same as before.

Figure 4:
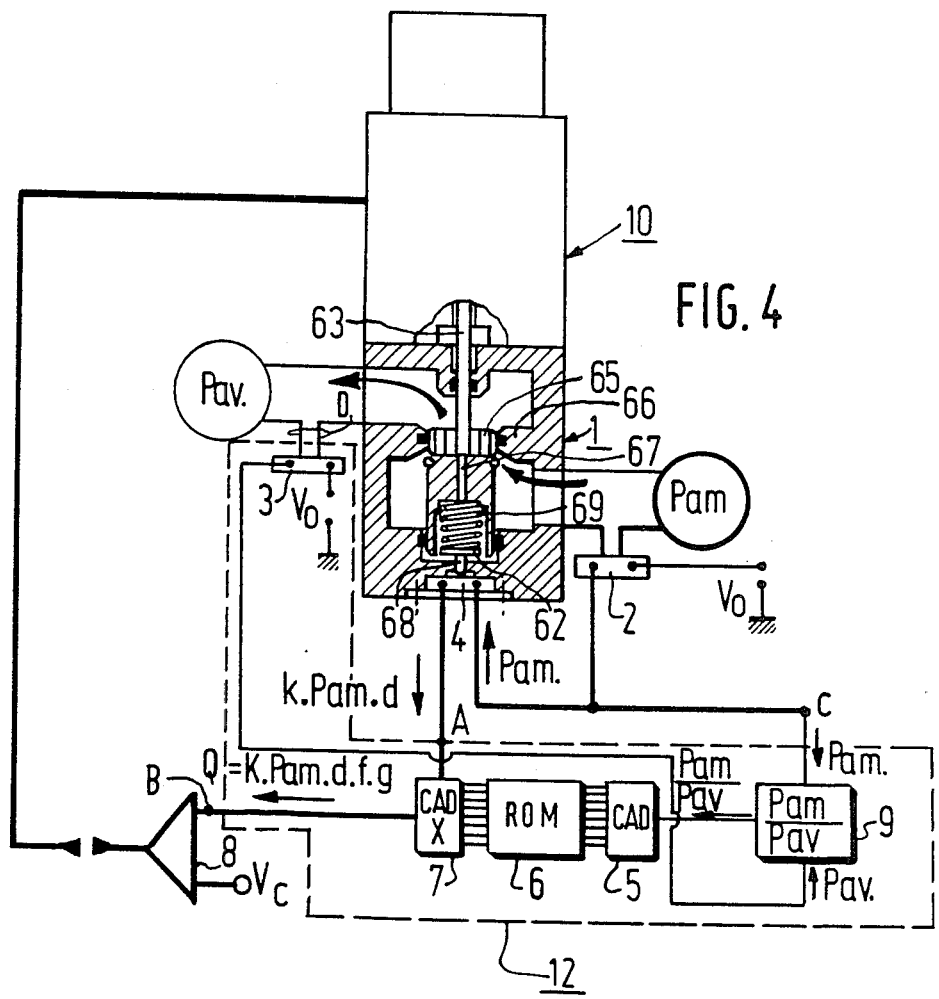
FIG. 4 is a view of a practical embodiment with a system using pressure cells having a gauge bridge.

FIG. 4 represents an example of application of the diagram of FIG. 1 with a valve 1 whose valve member displacement is measured by a pressure sensor 4. The three pressure sensors employed in this diagram, namely sensors 2, 3 and 4, are similar and are pressure cells formed by a ceramic membrane on which a gauge bridge has been deposited by serigraphy (thick layer deposition). This membrane is embedded by means of high temperature glass in a ceramic base. The stress gauge bridge is fed with electric current between two ends of the bridge while the voltage is measured at the other two ends, this voltage varying as a function of the pressure applied to the sensor, this pressure commanding a variation in the resistance of the elements of the sensor. Thus, under the action of the actuating device 10, the rod 63 is moved upwardly or downwardly and shifts the valve member 65 therewith, which is shifted a variable distance away from the seat 66 so as to modulate the gas flow in the direction of the arrows indicated in FIG. 4. When the valve member 65 is shifted, this valve member acts on the spring 69 which bears against the side wall 62 integral with the pin 68 which comes to bear against the pressure sensor 4. When the valve member 65 moves downwardly (as viewed in FIG. 4) the pin 68 increases its pressure on the sensor 4 and thus modifies the resistance of the gauge bridge 4. In the same way, when the valve member 65 moves upwardly, the pressure of the pin 68 is reduced and there is a corresponding modification in the resistances of the gauge bridge 4. The electrical information issuing from the sensor 2 and representing the value of the pressure $P_{upstream}$ is sent to the supply terminals of the sensor 4 and therefore produces on its output terminals an electric signal which is proportional to the product of the pressure $P_{upstream}$ and the displacement d of the valve member, this proportionality being represented by the coefficient K (a particularity of pressure sensors having a gauge bridge used is to deliver an output signal which is proportional to the pressure and the supply voltage).

As before, this information is transmitted through the input A of the device 12 to the device 7 which delivers a signal $$Q = K(P_{upstream}) \times D \times f \times g$$

(see above the signification of these various functions).

Figure 5:
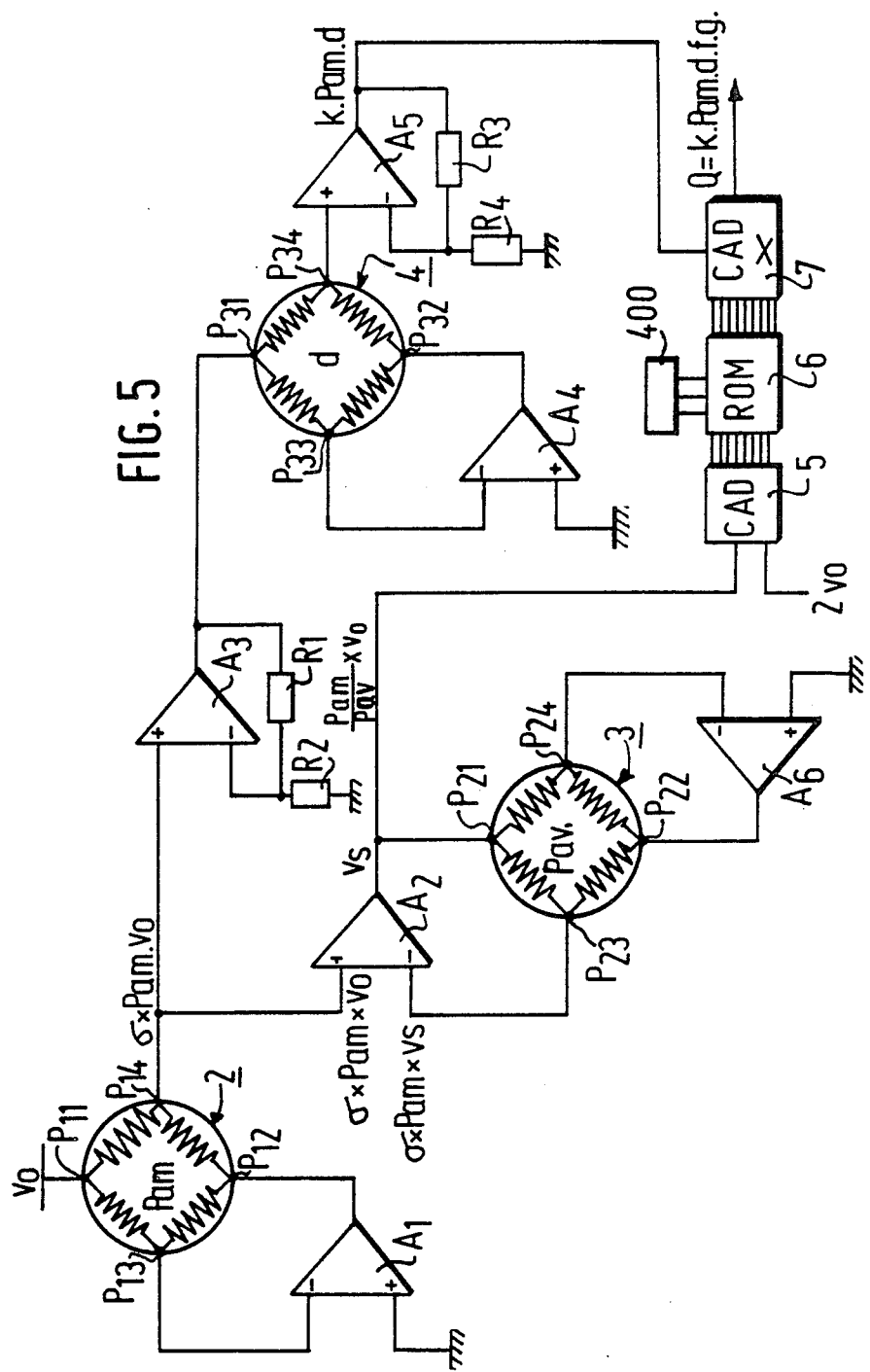
FIG. 5 is an electric diagram controlling the gauge bridge cells represented in FIG. 4.

FIG. 5 is a detailed view of the electric circuit controlling the sensors 2, 3 and 4 adapted to the operation of the device according to the invention. The sensor of pressure $P_{upstream}$ 2 is diagrammatically represented by its four resistors connected as a bridge. The supply voltage $V_O$ is applied to the point $P_{11}$ while the point $P_{12}$ of the bridge facing $P_{11}$ is connected to the output of the operational amplifier $A_1$ whose + terminal is grounded. The − terminal of this amplifier is connected to the input $P_{13}$ of the bridge whose output $P_{14}$ delivers the electric signal $\gamma \times P_{upstream} \times V_O$. $\gamma$=sensitivity of the bridge). This signal is delivered, on one hand, to the + input of the comparator amplifier $A_2$, and, on the other hand, to the + input of the operational amplifier $A_3$, the latter being conventionally mounted by means of the bridge of resistors $R_2$ and $R_1$ connected between the ground and the output of $A_3$, the common point of which is connected to the − input. The output of the amplifier $A_3$ is connected to the pressure sensor 4 through its input $P_{31}$, the opposite input $P_{32}$ being connected to the output of the amplifier $A_4$ whose + terminal is grounded while the − terminal of $A_4$ is connected to the input $P_{33}$ of the bridge 4. The bridge $P_{34}$ delivers an electric signal to the + input of the amplifier $A_5$. The bridge of resistors $R_3$, $R_4$ is connected between the − input of the amplifier $A_5$ and its output. The output of this comparator amplifier $A_5$ delivers a signal $K \times P_{upstream} \times D$ to the digital/analog converter multiplier 7. Further, the output of the amplifier $A_2$ is connected to the input $P_{21}$ of the downstream pressure sensor 3 whose opposite input $P_{22}$ is connected to the output of the amplifier $A_6$ whose + terminal is grounded and whose − terminal is connected to the input $P_{24}$ of the sensor 3. The bridge output $P_{23}$ is itself connected to the − input of $A_2$. Thus the output of the amplifier $A_2$ delivers a signal $P_{upstream}/P_{downstream} \times V_O$ to the input of the analog/digital converter 5, since the sensor 3 is of the type delivering an output signal between $P_{23}$ and $P_{24}$ which is a proportional on the one hand to the downstream pressure of the fluid and on the other hand to the supply voltage between $P_{21}$ and $P_{22}$. The converter 5 has a reference value which is in the present case 2V. Indeed, when $P_{upstream}/P_{downstream}$ is greater than substantially 2, the flow becomes sonic and, under these conditions, the correction coefficient G is equal to 1. Thus the passage from the subsonic rate to the sonic rate is resolved simply in the following manner. As $P_{upstream}/P_{downstream}$ is always greater than or equal to 1, the $P_{upstream}/P_{downstream} V_O$ is always greater than $V_O$. Bearing in mind the fact that the reference value at the input of the analog-diital converter 5 is $2V_O$, this means that this converter will convert any analog value at the input between 0 and $2V_O$ into a digital value. In the present application, no value between 0 and $V_O$ will be present at the input of the converter. This implies that all the corresponding memory locations in the ROM 6 are not used. Each value between $V_O$ and $2V_O$ according to the multiplier ratio $P_{upstream}/P_{downstream}$ is converted by the converter 5 into a digital value. If there are $2^n$ memory levels between $V_O$ and $2V_O$, the level between two successive measurements could not be less than $\frac{1}{2}^n$ excluding zero and the result will be rounded off to the nearest lower or upper value. The device shown in FIG. 5 also includes a gas switch 400. Indeed, a given number of gases may also be provided. For example, in the case illustrated in FIG. 5, the switch 400 permits a selection from eight gases (selection on three bits). In this way, it will be necessary to have a memory which is addressed on the one hand from three given bits by the gas selector and on the other hand by the number of bits delivered by the converter 5 (for example eight in the example given above), the correction coefficient to be applied having therefore an address of 11 bits (the case of a memory having 16K bits). The correction coefficient delivered to the converter 7 may be a signal of 8 bits which, after the conversions explained above, enables the converter 7 to deliver a signal $Q = K \times P_{upstream} \times D \times f \times g$.

What is claimed is:

1. A process for controlling the flow at a sonic and subsonic rate of a fluid through a valve of given section having a movable valve member, said process comprising initially calculating a plurality of correction coefficients in dependence on corresponding selected values of a ratio of the pressure of the fluid upstream of the valve $P_{upstream}$ and downstream of the valve $P_{downstream}$, each of the coefficients being indicative of a flow $Q_{real}$ of the fluid for the respective ratio, the selected values of the ratio corresponding to respective subsonic rates of the flow $Q_{real}$, and initially storing the plurality of correction coefficients in a memory having a pluralaity of memory locations having respective addresses, respective ones of said correction coefficients being stored in respective ones of said memory location.

measuring the upstream pressure $P_{upstream}$ and the downstream pressure $P_{downstream}$ and the position d of the valve member, calculating the flow $Q_{real}$ of the fluid and comparing it with a set value $Q_O$, the difference signal $Q_{real} - Q_O$ commanding the displacement of the valve member in the desired direction, the flow $Q_{real}$ being calculated by first of all effecting the product $Q_{sonic} = k \times P_{upstream} \times d$ representing the real flow of the fluid when the flow rate of the fluid is sonic, k representing a constant which is a function of the temperature of the fluid and of the section of the valve, then comparing the upstream pressure $P_{upstream}$ with the downstream pressure $P_{downstream}$ so as to determine whether the flow of the fluid is at a sonic or subsonic rate, the flow $Q_{sonic}$ representing the real flow $Q_{real}$ when the flow rate is sonic, accessing the memory when the flow rate is subsonic to read out therefrom the correction coefficient corresponding to a ratio of the measured upstream pressure $P_{upstream}$ and the measured downstream pressure $P_{downstream}$, and multiplying the value $Q_{sonic}$ by the read-out correction coefficient only when the flow rate is subsonic so as to obtain the value $Q_{real}$ of the real flow, and controlling said valve in response to the value $Q_{real}$ of the real flow for both sonic and subsonic flow.

2. A process according to claim 1, wherein each said correction coefficient is stored in a respective memory location whose address is a function of the value of the corresponding ratio $P_{upstream}/P_{downstream}$.

3. A process according to claim 1, wherein the calculation of the real flow is effected by measuring the ratio $R = P_{upstream}/P_{downstream}$ which is compared with a predetermined value $R_O$ and by calculating the product $Q_{sonic} = k \times P_{upstream} \times d$ so that, when $R > R_O$, the product $Q_{sonic}$ is directly compared with a set value $Q_O$, the difference signal $Q_{sonic} - Q_O$ commanding the displacement of the valve member in the desired direction whereas, when $R < R_O$, the ratio R is converted into a digital signal whose value corresponds to the address of said memory containing a digital value which is converted into an analog correction signal which, after multiplication by $Q_{sonic}$, represents a value proportional to the flow $Q_{subsonic}$ of the fluid at the subsonic rate, said value $Q_{subsonic}$ being then compared with a set value $Q_O$, the signal $Q_{subsonic} - Q_O$ commanding the displacement of the valve member in the desired direction.

4. A process according to claim 1, comprising measuring a pressure variation with a pressure sensor mechanically connected to the valve member of the valve for determining variations in the position of the valve member.

5. A process according to claim 1, comprising, for directly obtaining a ratio proportional to $P_{upstream}/P_{downstream}$, employing pressure sensors having a gauge bridge for measuring $P_{upstream}/P_{downstream}$, the electric signal delivered between two opposed output terminals of the bridge being proportional, on one hand, to the supply voltage between two supply terminals of the bridge and, on the other hand, to the pressure measured by the sensor.

* * * * *